United States Patent [19]

Clark

[11] Patent Number: 5,522,172
[45] Date of Patent: Jun. 4, 1996

[54] YELLOW JACKET BAIT STATION

[76] Inventor: Charles D. Clark, 25286 Ramblewood Ct., Moreno Valley, Calif. 92553

[21] Appl. No.: 274,773

[22] Filed: Jul. 14, 1994

[51] Int. Cl.$^6$ .................................................. A01M 1/20
[52] U.S. Cl. ............................................................ 43/131
[58] Field of Search ............................ 43/131, 107, 122, 43/132.1, 113

[56] References Cited

U.S. PATENT DOCUMENTS

| | | | |
|---|---|---|---|
| 1,012,566 | 12/1911 | Maire | 43/107 |
| 1,667,876 | 5/1928 | Steiner | 43/113 |
| 3,968,590 | 7/1976 | Kitterman | 43/107 |
| 4,523,717 | 6/1985 | Schwab | 43/131 |
| 5,020,270 | 6/1991 | Lo | 43/113 |
| 5,311,697 | 5/1994 | Cavanaugh | 43/132.1 |
| 5,363,589 | 11/1994 | Flynn | 43/107 |

*Primary Examiner*—Kurt Rowan
*Attorney, Agent, or Firm*—Lyon & Lyon

[57] ABSTRACT

An insect bait station comprising a base, a plurality of containers to hold insect bait, meshed siding to allow easy insect penetration, a cap to enclose the device, and a threaded tube with a fastener to secure the cap to the base.

2 Claims, 1 Drawing Sheet

YELLOW JACKET BAIT STATION

BACKGROUND OF THE INVENTION

The field of the present invention is pest control devices.

Yellow jackets and other wasps can become severe pests when they nest and feed around populated areas. They can inflict painful stings in humans. Thousands of people are stung each year in the United States alone. People sensitive to wasp venom often require hospitalization. Several people die every year from yellow jacket stings.

The yellow jacket nest is started every season in the early spring by a mated queen. The queen first constructs a small nest. She then develops the colony by brooding eggs and foraging for protein which she feeds the developing larvae. After the first worker yellow jackets emerge, they assume the feeding and nest-building duties previously performed by the queen. The queen thereafter remains in the nest permanently to lay eggs for a continuous brood. In this way, the nest and yellow jacket population increase rapidly. The need for increased larval food intensifies the foraging behavior of the workers. Thus, yellow jackets rapidly become a nuisance to the surrounding human population.

For these reasons, people have tried to control the yellow jacket population for many years. Specialized spray bombs or various types of toxicants applied directly to nests have been traditionally used to eliminate concentrated yellow jacket populations. The direct application of these bombs and toxicants can be extremely hazardous and needs to be performed by experienced personnel.

Several stand-alone traps have been developed to attract and kill yellow jackets, but these have proved to be ineffectual or difficult to use. Conventional traps typically attract and catch only workers, leaving the intact yellow jacket colony behind. Furthermore, conventional traps are either disposable or difficult to clean.

SUMMARY OF THE INVENTION

The present invention is directed to an insect bait station specially designed to destroy entire colonies of yellow jackets and other insects. The bait station of the present invention attracks the insects, allows them to pick up poison, and exit to carry the poison back to their colonies. To this end, a base is used to support several containers which can be filled with various types of bait. A wire mesh is attached to the periphery of the base to allow the insects to enter and exit the bait station freely. A cap closes off the bait station. Finally, a threaded tube and a fastener secure the cap to the base.

Accordingly, it is an object of the present invention to destroy entire colonies of yellow jackets and other wasps, including all workers, offsprings, and reproductives.

It is another object of the present invention to provide a practical bait station which is reusable season after season, easy to operate and maintain by anybody, and which allows plenty of space for labeling as needed.

Other and further objects and advantages will appear hereinafter.

DETAILED DESCRIPTION OF THE PREFERRED EMBODIMENT

The preferred embodiment will now be described in detail with reference to the drawings. Like elements appearing in multiple drawings are similarly numbered.

Figure 1:
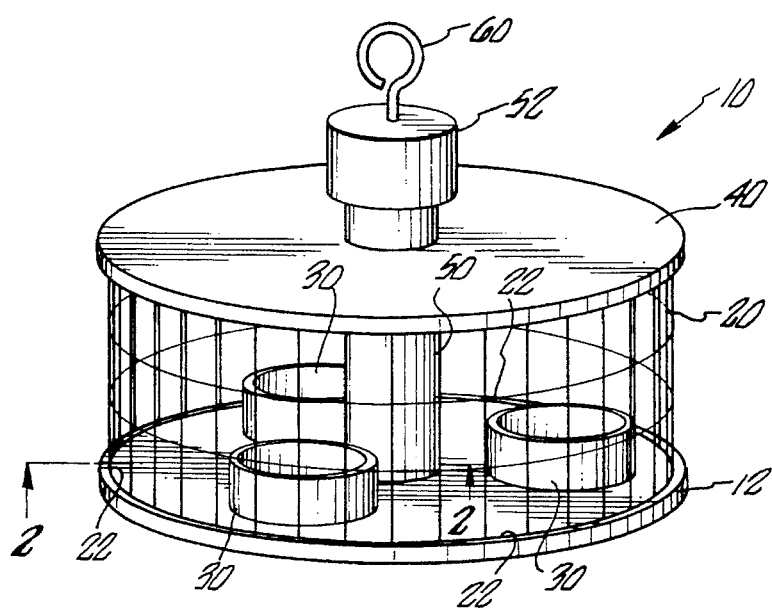
FIG. 1 is a perspective view of the insect bait station of the present invention.

FIG. 1 illustrates an insect bait station 10 employing a base 12 with a hole at its center. In the preferred embodiment, the base 12 is a disc made of thick and durable plastic.

A siding 20 encircles the periphery of the base 12. In the preferred embodiment, the siding 20 is attached to the base 12 using a plurality of clips 22. The siding 20 is a wire mesh with openings large enough to allow insects to enter and exit the bait station 10 easily.

Inside the siding 20 and attached to the base 12 are a plurality of containers 30 which are open at the top. In the preferred embodiment, there are three round containers 30 which are made of clear plastic, and which are sized to allow the desired quantity of insect toxicant bait. Any type of bait can be used, be it either liquid or solid. In other embodiments, the containers can be any shape, size, and material.

Resting on the top of the siding 20 is a cap 40. In the preferred embodiment, the cap is a disc made of thick and durable plastic, and has the same dimensions as the base 12.

Figure 2:
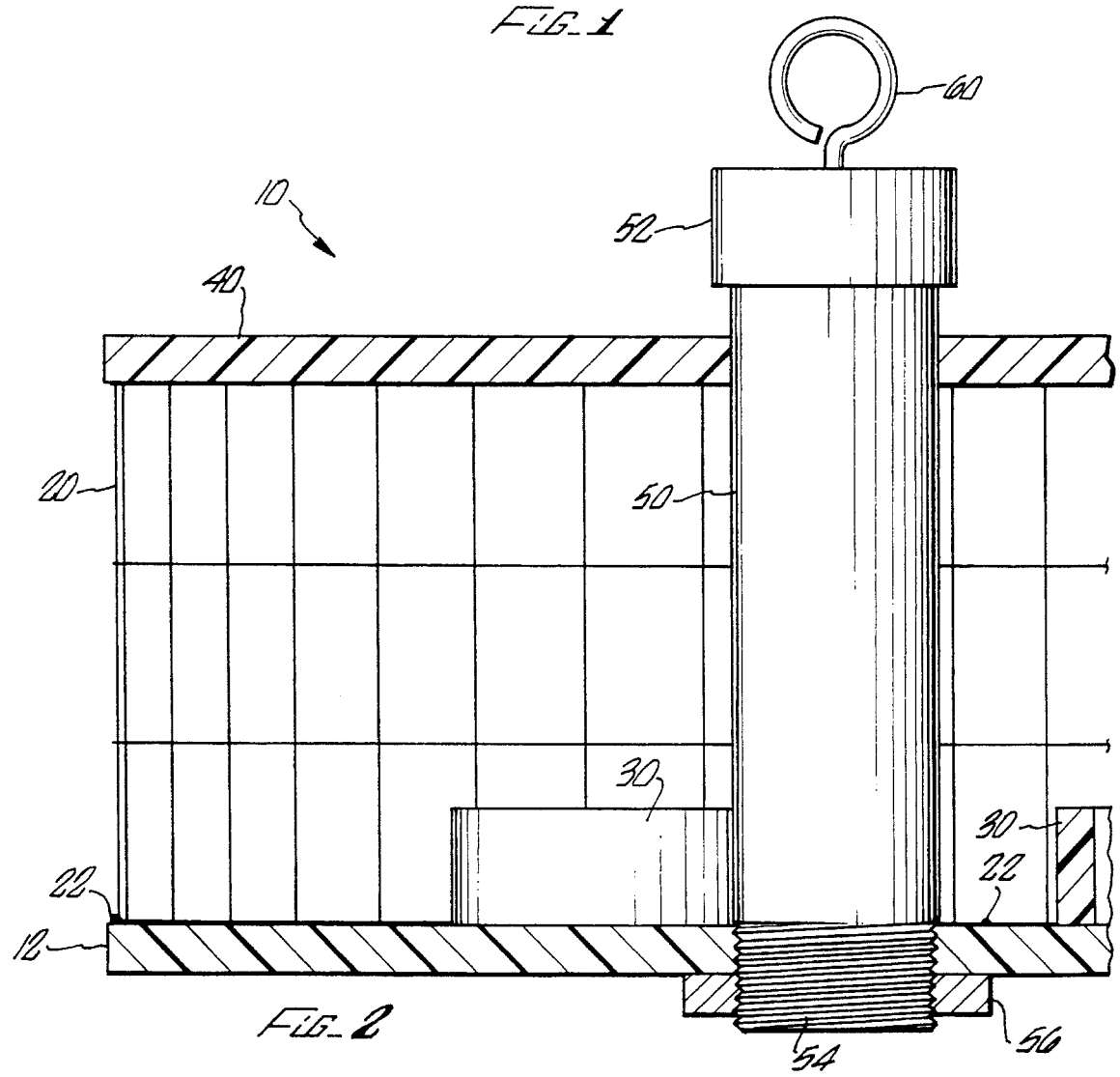
FIG. 2 is a cross-sectional view through the center of the insect bait station of FIG. 1.

FIG. 2 illustrates a tube 50 which is attached to the center of the cap 40. The tube 50 has an upper section 52 which protrudes through the cap 40. Furthermore, the tube 50 is threaded over the outside of its lower section 54. The lower section 54 protrudes through the hole at the center of the base 12. A separate fastener 56 has inside threads matched to the outside threads of the lower section 54 of the tube 50.

Finally, a hook 60 is attached to the upper section 52 of the tube 50. The hook 60 is designed to allow for the bait station's easy hanging on trees, poles, or the like.

When the cap 40 is placed over the top of the siding 20, the tube 50 passes through the hole at the center of the base 12. Then, the fastener 56 is connected to the lower section 54 of the tube 50 to secure the cap 40 to the base 12. In this fashion, the bait station 10 forms an enclosure defined by the base 12 at the bottom, the siding 20 on the sides, and the cap 40 on the top.

Thus, an insect bait station is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An insect bait station comprising:

a base;

a fastener having inside threads;

a siding attached to the perimeter of said base, said siding being meshed to allow insect penetration;

a plurality of containers attached to the inside of said base to hold insect bait;

a cap which rests on top of said siding to enclose the device;

a tube protruding through said base, said tube also protruding through said cap, said tube being attached to said cap, said tube having outside threads over its lower section matched to the inside threads of said fastener, whereby said cap can be secured, through said tube, to said base.

2. An insect bait station, comprising:

a base;

a fastener having inside threads;

a siding attached to said base, said siding being meshed to allow insect penetration;

a plurality of containers attached to the inside of said base to hold insect bait;

a cap which rests on top of said siding to enclose the device;

a tube protruding through said base, said tube also protruding through said cap, said tube being attached to said cap, said tube having outside threads over its lower section matched to the inside threads of said fastener, whereby said cap can be secured, through said tube, to said base;

a hook attached to the top of said tube for hanging.

* * * * *